United States Patent
Baukema et al.

(10) Patent No.: US 10,703,933 B2
(45) Date of Patent: Jul. 7, 2020

(54) COREACTANTS FOR POLYUREA COATINGS

(71) Applicant: The Sherwin-Williams Company, Cleveland, OH (US)

(72) Inventors: Paul R. Baukema, Roscoe, IL (US); Sanjay Luthra, Hawthorn Woods, IL (US)

(73) Assignee: The Sherwin-Williams Company, Cleveland, OH (US)

(*) Notice: Subject to any disclaimer, the term of this patent is extended or adjusted under 35 U.S.C. 154(b) by 0 days.

(21) Appl. No.: 14/572,190

(22) Filed: Dec. 16, 2014

(65) Prior Publication Data

US 2015/0105517 A1    Apr. 16, 2015

Related U.S. Application Data

(63) Continuation of application No. PCT/US2013/047368, filed on Jun. 24, 2013.

(60) Provisional application No. 61/664,213, filed on Jun. 26, 2012.

(51) Int. Cl.
| | | |
|---|---|---|
| *C09D 175/02* | (2006.01) | |
| *C08G 18/79* | (2006.01) | |
| *C08G 18/28* | (2006.01) | |
| *C08G 18/38* | (2006.01) | |

(52) U.S. Cl.
CPC ......... *C09D 175/02* (2013.01); *C08G 18/284* (2013.01); *C08G 18/3821* (2013.01); *C08G 18/792* (2013.01)

(58) Field of Classification Search
CPC .... C09D 175/02; C09D 7/12; C08G 18/3228; C08G 18/325; C08G 18/284
See application file for complete search history.

(56) References Cited

U.S. PATENT DOCUMENTS

| | | | |
|---|---|---|---|
| 3,985,691 A * | 10/1976 | De Taffin | C09D 101/18 524/716 |
| 5,126,170 A | 6/1992 | Zwiener et al. | |
| 5,236,741 A | 8/1993 | Zwiener et al. | |
| 5,243,012 A | 9/1993 | Wicks et al. | |
| 5,580,945 A * | 12/1996 | Wade | C08G 18/281 524/773 |
| 6,762,230 B2 | 7/2004 | Brandenburger et al. | |
| 7,427,647 B2 | 9/2008 | Reinartz et al. | |
| 7,968,197 B2 | 6/2011 | Barancyk et al. | |
| 8,137,813 B2 | 3/2012 | Senkfor et al. | |
| 2011/0151113 A1 * | 6/2011 | Wang et al. | 427/137 |
| 2013/0116379 A1 | 5/2013 | Wamprecht | |
| 2013/0131222 A1 * | 5/2013 | Gross | 524/35 |

FOREIGN PATENT DOCUMENTS

WO    2011126562 A2    10/2011

OTHER PUBLICATIONS

International Search Report and Written Opinion for International Application No. PCT/US2013/047368, dated Mar. 26, 2014.

* cited by examiner

*Primary Examiner* — Michael L Leonard
(74) *Attorney, Agent, or Firm* — Merchant & Gould P.C.

(57) ABSTRACT

A method to accelerate cure of a multicomponent coating composition is described herein, including the steps of providing an isocyanate and an isocyanate-reactive compound, and replacing a portion of the isocyanate-reactive compound with a compound of formula I:

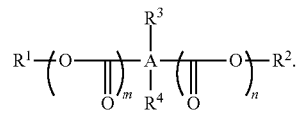

7 Claims, No Drawings

COREACTANTS FOR POLYUREA COATINGS

This application is a continuation of International Application No. PCT/US2013/047368 filed 24 Jun. 2013, which claims priority to U.S. Provisional Application No. 61/664,213, filed 26 Jun. 2012, each of which is incorporated by reference herein.

BACKGROUND OF THE INVENTION

Two-component, polyurea compositions are useful in making a wide variety of coatings. These coatings are typically hard, abrasion-, weather- and solvent-resistant. Coating compositions of this type typically include polyisocyanate and isocyanate-reactive compounds, typically primary amines and secondary functional amines such as polyaspartic esters, as coreactants. Polyurea compositions of this type are frequently used in protective coatings for steel and concrete substrates. In an emerging area of technology, high solids coatings are now made using a blend of polyaspartic esters with varying reactivity to obtain compositions that balance application properties against viscosity and cure speed, and yet have very low organic volatile content.

SUMMARY OF INVENTION

The present invention provides coating compositions with reduced viscosity and accelerated cure. The coating compositions are multicomponent polyurea coatings with lower initial mixed viscosity relative to compositions known in the art, but also surprisingly demonstrate faster cure speed with improved abrasion resistance and without significant detrimental effect on film hardness and chemical spot resistance.

In an embodiment, the present invention provides a method to reduce viscosity and/or accelerate cure of a multicomponent polyurea coating system, by combining at least one amino-functional compound with an isocyanate-functional compound, and a compound of formula I:

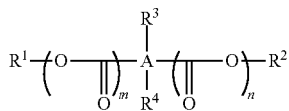

Including the compound of formula I, or replacing a portion of the amino-functional compound with the compound of formula I reduces the initial mixed viscosity of the coating composition and accelerates cure without significant impact on coating hardness after application.

In one embodiment, a method to reduce the viscosity of a multicomponent polyurea coating composition is provided. In another embodiment, a method to accelerate cure of a multicomponent polyurea coating composition is provided. The method includes steps of providing at least one component that is isocyanate-functional, at least one component that is isocyanate-reactive, i.e. capable of reacting with the isocyanate-functional component, and a component that includes the compound of formula I, as shown above. A portion of the isocyanate-reactive component is replaced with a compound of the structure shown in formula I. The coating compositions produced by the methods described herein include multicomponent polyurea coatings that show reduced initial mixed viscosity and accelerated cure without significant loss of performance characteristics such as hardness, abrasion resistance and the like, when compared to compositions made by conventional methods.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and the description below. Other features, objects, and advantages of the invention will be apparent from the description and drawings, and from the claims.

Selected Definitions

Unless otherwise specified, the following terms as used herein have the meanings provided below.

As used herein, "multicomponent" coating means a coating composition that contains two or more components that are mixed together and applied to a substrate prior to curing. A "component" means any compound that includes a particular feature or structure. Examples of components include compounds, monomers, oligomers, polymers, and organic groups contained there. Typically, the coating composition includes two components.

As used herein, the term "coating" refers to a continuous or substantially continuous film of an aliphatic coating composition. The term "aliphatic coating" refers to a coating made by curing a composition produced as a result of a reaction between aliphatic reactants, such as, for example, a polyurethane or polyurea coating produced by reaction of aliphatic polyisocyanates with aliphatic polyols. The term "aliphatic" refers to saturated or unsaturated, linear or branched hydrocarbons, and within the context of this application, the term also refers to saturated or unsaturated cyclic hydrocarbons.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "alkynyl group" means an unsaturated, linear or branched hydrocarbon group with one or more carbon-carbon triple bonds. The term "cyclic group" means a closed ring hydrocarbon group that is classified as an alicyclic group or an aromatic group, both of which can include heteroatoms. The term "alicyclic group" means a cyclic hydrocarbon group having properties resembling those of aliphatic groups. The term "Ar" refers to a divalent aryl group (i.e., an arylene group), which refers to a closed aromatic ring or ring system such as phenylene, naphthylene, biphenylene, fluorenylene, and indenyl, as well as heteroarylene groups (i.e., a closed ring hydrocarbon in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "heteroarylene" groups (e.g., furylene, pyridylene, etc.).

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

The term "crosslinker" refers to a molecule capable of forming a covalent linkage between polymers or between two different regions of the same polymer.

The term "self-crosslinking," when used in the context of a self-crosslinking polymer, refers to the capacity of a polymer to enter into a crosslinking reaction with itself and/or another molecule of the polymer, in the absence of an external crosslinker, to form a covalent linkage therebetween. Typically, this crosslinking reaction occurs through reaction of complimentary reactive functional groups present on the self-crosslinking polymer itself or two separate molecules of the self-crosslinking polymer.

Unless otherwise indicated, a reference to a "(meth)acrylate" compound (where "meth" is bracketed) is meant to include both acrylate and methacrylate compounds.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

The present invention includes a method to accelerate cure of a multicomponent aliphatic coating. The method includes steps of providing at least one isocyanate-functional component, at least one isocyanate-reactive component, and a compound of formula I:

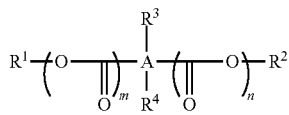

When a compound of formula I is included, the methods described herein produce a multicomponent coating composition that has reduced initial viscosity for at least one of the components and reduced mixed viscosity, and cures or hardens at a faster rate than a coating that includes only the isocyanate-functional and isocyanate-reactive components. The accelerated cure is demonstrated by various properties including, without limitation, reduced viscosity, reduced set-to-touch time and reduced tack-free dry time. In an aspect, adding a compound of formula I to the composition does not significantly reduce film hardness, or alter performance characteristics such as, for example, abrasion resistance or chemical spot resistance.

In an embodiment, the present invention provides a method to reduce viscosity and accelerate cure of a multicomponent coating system. Coating systems made by the methods described herein include, for example, polyaspartic coating systems, and the like.

In an embodiment, the multicomponent coating system typically includes two or more components capable of reacting with one another, i.e. the components are co-reactants. The multicomponent coating system is preferably a two-component coating system, where each of the components is capable of reacting with the other. For example, a two-component polyurethane coating system includes aliphatic polyisocyanate and aliphatic polyols as coreactants. Similarly, a two-component polyurea coating includes aliphatic polyisocyanate and polyamine. The methods described herein preferably include polyaspartic esters as coreactants for the aliphatic polyisocyanate.

In an embodiment, the multicomponent coating described herein includes at least one isocyanate-functional component as a coreactant. The isocyanate-functional component is preferably aliphatic polyisocyanate, or blend of polyisocyanates. The term "polyisocyanate" refers to any compound containing two or more isocyanate (—N=C=O, also termed NCO) functional groups, including diisocyanate and triisocyanate, for example. Polyisocyanates having 4 to 25 carbon atoms and from 2 to 4 isocyanate groups are preferred. Suitable polyisocyanate compounds for use in the methods described herein include, without limitation, polymers, semi-polymers or prepolymers made from aliphatic isocyanate-functional compounds, such as for example, hexamethylene diisocyanate (HDI), isophorone diisocyanate (IPDI), and the like, including derivatives and isomers of the above, mixtures of the above with isomers and higher molecular weight homologues, such as, for example, polyisocyanates obtained by phosgenation of aniline/formaldehyde condensates, etc. Aliphatic polyisocyanates, such as HDI, and isomers, higher molecular weight homologues and mixtures of the above, for example, are preferred.

Isocyanate-functional compounds, or polyisocyanates, for use in the methods described herein are prepared from low molecular weight polyols, including, without limitation, ethylene glycol, propylene glycol, trimethylol propane, 1,6-dihydroxy hexane, low molecular weight hydroxy-functional esters of these polyols and dicarboxylic acids, low molecular weight ethoxylation and/or propoxylation products of these polyols, mixtures of the polyols, and the like. Suitable polyisocyanates preferably have molecular weight of about 160 to about 200, and NCO content of 5 wt-% to 40 wt-%, preferably 10 wt-% to 30 wt-%, and most preferably 15 wt-% to 25 wt-%. Suitable polyisocyanates preferably have viscosity of 10,000 mPa·s, more preferably about 2,000 to 4,000 mPa·s, most preferably about 2,500 to 3,000 mPa·s.

Polyisocyanate compounds for use in the methods described herein are prepared from prepolymers and semi-prepolymers of relatively high molecular weight polyhydroxyl compounds with a molecular weight of 300 to about 8000, preferably about 1000 to 5000, as determined from the functionality and the hydroxyl number. These polyhydroxyl compounds have at least two hydroxyl groups per molecule and generally have a hydroxyl group content of about 0.5 to 17% by weight, preferably about 1 to 5% by weight. Examples of suitable relatively high molecular weight polyhydroxyl compounds used for the preparation of the prepolymers and semi-prepolymers include, without limitation, polyester polyols based on low molecular weight, monomeric alcohols and polybasic carboxylic acids such as adipic acid, sebacic acid, phthalic acid, isophthalic acid, tetrahydrophthalic acid, hexadydrophthalic acid, maleic acid, the anhydrides of these acids and mixtures of these acids and/or acid anhydrides. Hydroxyl group-containing polylactones, especially poly-ε-caprolactones, are also suitable for the preparation of the prepolymers and semi-prepolymers. Isocyanate-substituted biuret or derivatives thereof, isocyanurate compounds, and the like may also be used.

In an embodiment, the methods described herein include providing at least one component that is capable of reacting with a polyisocyanate or blend of polyisocyanates, i.e. an isocyanate-reactive component or a compound that can be used as a coreactant to produce a multicomponent polyurea coating composition. In an aspect, the coreactant may be a mixture or blend of compounds capable of reacting with a polyisocyanate or blend of polyisocyanates to produce a multicomponent polyurea coating composition.

Suitable isocyanate-reactive components or coreactants include those containing active hydrogen groups or active basic groups neutralized with an acid such as for example, aliphatic, cycloaliphatic and heterocyclic amino alcohols, diols, triols, amines, diamines, triamines, tetramines and amides. Other suitable compounds for reaction with a polyisocyanate also include for example, organic acids such as formic acid and acetic acid, inorganic acids such as hydrochloric acid and sulfuric acid, and ethylenically unsaturated monomers and their derivatives, such as polyacrylates, for example. Hydroxy-functional copolymers of ethylenically unsaturated are particularly preferred, including copolymers with number average molecular weight ($M_n$) of preferably about 800 to about 50,000, more preferably about 1000 to about 20,000, and most preferably about 5000 to about 10,000. The hydroxy-functional copolymers have hydroxyl group content of about 0.1% to about 12% by weight, preferably about 1% to about 10% by weight, and most preferably about 2% to about 6% by weight.

Suitable ethylenically unsaturated monomers used to prepare the hydroxy-functional copolymers include, for example, vinyl and vinylidene monomers such as styrene, α-methyl styrene, o- and p-chloro styrene, o-, m- and p-methyl styrene, p-tert.-butyl styrene; acrylic acid; (meth) acrylonitrile; acrylic and methacrylic acid esters of alcohols containing 1 to 8 carbon atoms such as ethyl acrylate, methyl acrylate, n- and isopropyl acrylate, n-butyl acrylate, 2-ethylhexyl acrylate, 2-ethylhexyl methacrylate, iso-octyl acrylate, methyl methacrylate, ethyl methacrylate, butyl methacrylate and iso-octyl methacrylate; diesters of fumaric acid, itaconic acid or maleic acid having 4 to 8 carbon atoms in the alcohol component; (meth)acrylic acid amide; vinyl esters of alkane monocarboxylic acids having 2 to 5 carbon atoms such as vinyl acetate or vinyl propionate; and hydroxyalkyl esters of acrylic acid or methacrylic acid having 2 to 4 carbon atoms in the hydroxyalkyl group such as 2-hydroxyethyl-, 2, hydroxypropyl-, 4-hydroxybutyl-acrylate and methacrylate and trimethylol propane-mono- or pentaerythritomono-acrylate or methyacrylate. Mixtures of the monomers exemplified above may also be used for the preparation of the hydroxy functional polyacrylates.

In an aspect, aliphatic or cycloaliphatic compounds with secondary amine functionality are preferred as co-reactants for the polyisocyanate. Aliphatic or cycloaliphatic polyamines are particularly preferred. Suitable polyamines include high molecular weight amines with number average molecular weight ($M_n$) of about 400 to about 10,000, preferably about 500 to about 6,000; or low molecular weight amines with $M_n$ less than about 400.

In an aspect, aliphatic or cycloaliphatic diamino-functional esters are preferred as coreactants for the polyisocyanate, and esters or derivatives of polyaspartic acid, i.e. polyaspartic ester particularly preferred. Polyaspartic esters are prepared by conventional methods known to those of skill in the art, including for example, by the reaction of primary polyamines with esters of dicarboxylic acids.

Suitable polyamines used in the preparation of polyaspartic acid derivatives such as polyaspartic ester include, without limitation, 1,4-diaminobutane, 1,6-diaminohexane, 2,2,4-trimethyl-diaminohexane, 2,4,4-diaminohexane, 1-amino-3,4,4-trimethyl-5-aminomethylcyclohexane, 4,4'-diamino-dicyclohexylmethane, and the like. Suitable esters of dicarboxylic acids include, without limitation, unsubstituted esters of ethylenically unsaturated dicarboxylic acids such as, for example, maleic acid, fumaric acid, alkyl- or alkenyl-substituted esters of maleic acid, fumaric acid, and the like.

In an embodiment, the multicomponent coating described herein includes a two-component formed by the reaction of at least one isocyanate-functional component, i.e. a polyisocyanate with at least one isocyanate-reactive component, i.e. a coreactant as described above, preferably a polyaspartic ester. Polyaspartic esters are known in the art as coreactants for aliphatic polyisocyanates in the preparation of low-VOC and zero-VOC high solids polyurea coatings. Coatings of this type are hard, elastic, abrasion resistant, solvent resistant and weather resistant.

In an embodiment, the properties of the coating composition described herein can be tailored to specific applications by varying the ratio of polyisocyanate to the isocyanate-reactive co-reactant, effectively the ratio of NCO groups in the polyisocyanate and to isocyanate-reactive groups, in the coreactant. In an aspect, the properties of the coating composition are varied by altering the ratio of NCO groups in the polyisocyanate with —NH groups in the polyaspartic ester, i.e. NCO:NH ratio. For the methods described herein, suitable NCO:NH ratios are from about 0.8:1 to about 2.25:1, preferably from about 0.8:1 to about 1.5:1, more preferably from about 0.8:1 to about 1.2:1, and most preferably from about 0.8:1 to about 1.1:1. In a preferred aspect, the NCO:NH ratio of the co-reactants in a two-component coating composition as described herein is 1.05:1.

Conventionally, when a polyisocyanate compound, such as for example, Desmodur N-3390 (Bayer Material Sciences), is combined with a commonly used polyaspartic ester, such as for example, Desmophen 1520 (Bayer), the resulting coating composition shows slow viscosity build-up and slow dry time when compared to coating compositions made from less sterically-hindered polyaspartic esters (e.g., Desmophen 1420, Bayer). Often, the two different polyaspartic esters are combined in varying ratios and then used as coreactants for polyisocyanate, resulting in multicomponent polyurea coatings with desired pot life, dry times, curing speed, and the like. Without limiting to theory, it is believed that inclusion of the faster-reacting polyaspartic esters drives reaction mechanics and results in shorter dry times and faster cure. However, the compositions may have shorter useful work-life, with the viscosity becoming too high to achieve desired surface appearance and film properties.

Accordingly, in an embodiment, the methods of the present invention include providing an additional coreactant. The coreactant is combined with the isocyanate-functional component and isocyanate-reactive component to produce the coating composition. Preferably, the compound of formula I is non-reactive, and has relatively low VOC and low molecular weight. Suitable compounds have low number average molecular weight ($M_n$) of no more than about 750, more preferably no more than about 500.

In an embodiment, the compound to be included in the methods described herein is a compound of the general formula:

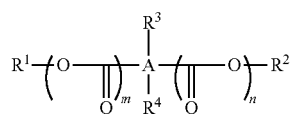

(I)

In formula (I), A is a divalent organic group, preferably having 2 to 20 carbon atoms, more preferably 3 to 5 carbon atoms. In an aspect, A is a divalent organic group of formula $C_1$-$C_{10}$ alkyl, $C_2$-$C_{10}$ alkylene or $C_3$-$C_{10}$ cycloalkyl, and $R^1$ and $R^2$ are independently hydrogen or an organic group, preferably a group having less than 100 carbon atoms. In an aspect, $R^1$ and $R^2$ are independently H, —C=O, substituted or unsubstituted $C_1$-$C_6$ alkyl. $R^3$ and $R^4$ are independently hydrogen or an organic group, preferably a group having less than 100 carbon atoms. In an aspect, $R^3$ and $R^4$ are independently H, substituted or unsubstituted $C_1$-$C_6$ alkyl, substituted or unsubstituted $C_3$-$C_6$ cycloalkyl, —$OR^5$ or —$C(O)OR^5$, where $R^5$ is hydrogen or an organic group, preferably a group having less than 100 carbon atoms. In an aspect, $R^5$ is hydrogen, substituted or unsubstituted $C_1$-$C_6$ alkyl, substituted or unsubstituted $C_3$-$C_6$ cycloalkyl, or $C_1$-$C_6$ alkoxy. In formula (I), m is 0 or 1; preferably 1, and n is 0 or 1, preferably 1.

Suitable compounds of formula (I) include, for example, compounds where A is a divalent carbon atom (i.e. —C—), $R^1$ and $R^2$ are each independently $C_1$-$C_4$ alkyl, preferably —$(CH_2)_3CH_3$. In an aspect, $R^3$ is —$OR^5$, preferably —OH, and $R^4$ is —$C(O)OR^5$, preferably —$C(O)O(CH_2)_3CH_3$. In an aspect, m and n are each independently 1.

Other suitable compounds of formula (I) include, for example, compounds where A is a divalent carbon atom (i.e. —C—), $R^1$ and $R^2$ are each independently $C_1$-$C_4$ alkyl, preferably —$(CH_2)_3CH_3$. In an aspect, $R^3$ is —$OR^5$, preferably —$O(C=O)CH_3$, and $R^4$ is —$C(O)OR^5$, preferably —$C(O)O(CH_2)_3CH_3$. In an aspect, m and n are each independently 1.

In an embodiment, the compounds of formula (I) include, for example, compounds where A is a divalent organic group of the formula —$(CH_2)_x$—, where x is preferably 0 to 10, more preferably 2 to 8, and most preferably 4 to 8. $R^1$ and $R^2$ are each independently $C_1$-$C_4$ alkyl, preferably —$(CH_2)_3CH_3$, $R^3$ and $R^4$ are independently each H, and m and n are each independently 1. In another embodiment, the compounds of formula (I) include, for example, compounds where A is a divalent organic group of the formula —C—$CH_2$—, $R^1$ is $(CH_3)_2CHCH(OH)$, $R^2$ is —$(CH_2)_3CH_3$, $R_3$ and $R_4$ are each independently —$CH_3$, m is 0 and n is 1.

In an embodiment, compounds of formula (I) include, for example, alkyl esters of polycarboxylic acids, preferably dicarboxylic acids, alkyl esters of hydroxy acids and hydroxy polyacids, including hydroxy-substituted dicarboxylic acids. Suitable compounds of formula (I) include, without limitation, tributyl citrate, tributyl acetyl citrate, dibutyl adipate, dibutyl sebacate and the like, or mixtures thereof.

In an embodiment, the methods described herein include replacing at least a portion of the isocyanate-reactive component of the multicomponent coating composition with a component including a compound of formula (I). In an aspect, preferably about 5% to 30%, more preferably about 10% to 25%, and most preferably, about 15% to 20% of the amino-functional component is replaced with a compound of formula (I). The replacement of at least a portion of the amino-functional component of the coating composition with the compound of formula (I) produces a coating with reduced initial mixed viscosity, reduced set-to-touch time and reduced tack-free dry time. Without being bound to theory, replacement of up to 20% of the amino-functional compound is believed to increase the overall crosslink density as measured by MEK double rub. Surprisingly, the replacement of up to 20% of the amino-functional compound with the compound of formula (I) did not significantly reduce film hardness.

In an embodiment, a coating composition that includes a compound of formula I may be made by combining the isocyanate-reactive component with the isocyanate-functional component in the presence of the compound of formula I. In an aspect, the isocyanate-reactive component, i.e. a polyaspartic acid or blend may be made in the presence of a compound of formula I, and then combined with the isocyanate-functional component, i.e., a polyisocyanate compound to produce the polyurea coating composition. Surprisingly, the incorporation of a compound of formula I leads to a decrease in dry time. Without being limited to theory, this effect is more pronounced at higher NCO:NH ratios.

In an embodiment, a coating composition that includes a compound of formula (I) shows improved adhesion to the substrate (as measured by standard dry and wet adhesion tests known in the art), and lower shrinkage of the crosslinked coating over time. This leads to increased durability of the coating. Without being bound to theory, the use of a compound of formula I reduces polyisocyanate demand in a two-component coating system, leading to reduced crosslinking, which benefits wetting of the substrate and improves adhesion. The coatings also show improved flexibility, as measured by standard methods known in the art.

In another embodiment, the methods described herein may be performed in the presence of a catalyst. In an aspect, a compound of formula I is added along with a catalyst to a polyisocyanate or blend of polyisocyanates and an isocyanate-reactive component to produce the coating composition. Suitable catalysts include, for example, alkyl substituted esters of maleic acid, succinic acid and the like. Dialkyl maleates and dialkyl succinates are preferred.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Test Methods

Unless indicated otherwise, the following test methods were utilized with the methods of the invention, including in the Example that follows.
Solvent Resistance Test
The extent of "cure" or crosslinking of a coating is measured as a resistance to solvents, such as methyl ethyl ketone (MEK) or isopropyl alcohol (IPA). This test is performed as described in ASTM D 5402-93 (Standard Practice for Assessing Solvent Resistance of Organic Coatings Using Solvent Rubs). The results of this test for coatings prepared according to the present invention are presented in Table 1.
Adhesion Test
Adhesion testing is performed to assess whether the coating adheres to the coated substrate. The adhesion test was performed either according to ASTM D 3359 (Standard Test Method for Measuring Adhesion by Tape Test) or DIN 53151 (Testing of Paints by Cross-cut).
Set-to-Touch Testing
Set-to-touch time (STT) is a reference to the time it takes for a film of a coating composition is still tacky, but no film is removed on contact with a finger. STT is typically measured by the methods described in ASTM D1640 (Drying, Curing or Film Formation of Coatings at Room Temperature). Tack-free, dry-to-touch, dry hard and dry through may also be used to describe cure or dry time of films.
Film Hardness
The hardness of a film of the coating composition is determined by the Koenig hardness or pendulum test, as described in ASTM D4366 (Standard Test Methods for Hardness of Organic Coatings by Pendulum Damping).
Viscosity
The initial and mixed viscosity of the coating composition is determined by the Gardner method, as described in ASTM D1725 (Standard Test Method for Viscosity of Resin Solutions).
Chemical Spot Resistance
The chemical resistance of the coating composition was tested according to spot tests using various chemicals, as described in ASTM D1308 (Standard Test Method for Effect of Chemicals on Clear and Pigmented Organic Finishes).

Example 1. Commercial Polyaspartic Ester Composition

Two commercially available polyaspartic esters or blends, DESMOPHEN NH 1420 and DESMOPHEN NH 1520 (Bayer Material Science, Leverkusen, Germany, were reacted with an HDI isocyanurate trimer, TOLONATE HDT (Perstorp, Toledo Ohio), at a constant NCO:NH ratio of 1.05:1. The mixtures were reduced to 75% non-volatile content using n-butyl acetate. Either 10% or 20% of the polyaspartic ester blend was replaced with tributyl citrate, or TBC (EPS, Marengo, Ill.). Dry times were measured after application, and physical properties were measured after seven (7) days of cure. Films that contained up to 20% tributyl citrate showed shorter set-to-touch time, without appreciable change in hardness and other physical properties, relative to control compositions that contained no tributyl citrate. Results with Desmophen 1520 are shown in Table 1.

TABLE 1

Evaluation of Cure and Physical Properties

| Film Properties | Desmophen 1520 | Desmophen 1520 + 10% Tributyl Citrate | Desmophen 1520 + 20% Tributyl Citrate |
| --- | --- | --- | --- |
| Initial Viscosity, "Part A" | W-X | T-U | N-O |
| Mixed Viscosity | A-A$_1$ | A$_1$ | A$_1$-A$_2$ |
| Set-to-touch (STT) | 10 h | 3 h | 3 h |
| Koenig Hardness | 210 s | 201 s | 171 s |
| MEK DR | 10 | 24 | 27 |

Example 2. Commercial Polyaspartic Ester Blend Composition

A first component of a coating composition was prepared by combining a commercially available polyaspartic ester or blend (DESMOPHEN 1520, Bayer) with tributyl citrate at either 15% or 20% of the total weight of the component. A control composition containing no TBC was also prepared. This first component was designated "Part A." A second component, an HDI isocyanurate trimer, TOLONATE HDT (Perstorp, Toledo Ohio) was prepared as described in Example 1. This second component was designated "Part B." Parts A and B were then combined to a constant NCO:NH ratio of 1.05:1 to produce the coating composition. Various properties of the composition, including dry time, abrasion resistance, adhesion and chemical spot resistance were measured. Results are shown in Table 2.

TABLE 2

Dry Time and Physical Properties

| Composition | 1 | 2 | 3 |
|---|---|---|---|
| Part A | | | |
| Desmophen 1520 | 100 | 85 | 80 |
| Tributyl Citrate | 0 | 15 | 20 |
| Part B | | | |
| HDI Adduct | 90 | 90 | 90 |
| N-butyl acetate | 10 | 10 | 10 |
| NCO/NH Index | 1.05 | 1.05 | 1.05 |
| Film Properties | | | |
| Tack Free time, Hrs | 9 | 8 | 7 |
| Dry to Touch time, Hrs | 18 | 12 | 9 |
| Abrasion resistance, mgs loss | 117 | 86 | 62 |
| Adhesion, % | 100% | | 100% |
| MEK double rubs | 60 | | 60 |
| Hydraulic fluid Resistance* | No Effect | | No Effect |
| Motor Fluid Resistance* | No Effect | | No Effect |
| Skydrol Resistance* | Severe Softening, swelling | | Severe Softening, swelling |
| Brake Fluid Resistance* | Severe Softening, swelling | | Severe Softening, swelling |
| 20% $H_2SO_4$* | Slight ring effect and haze | | Slight ring effect |
| Anti-Freeze* | Very slight ring | | No effect |

Example 3. Commercial Polyaspartic Ester Blend Composition

Parts A and B of the coating composition were prepared as described in Example 2. In combining parts A and B, the NCO:NH levels are maintained at a constant ratio of 1:1.2. Tack free time and dry time were measured, and results are shown in Table 3.

TABLE 3

Dry Time and Tack Free Time

| Composition | 1 | 2 | 3 |
|---|---|---|---|
| Part A | | | |
| Desmophen 1520 | 100 | 85 | 80 |
| Tributyl Citrate | 0 | 15 | 20 |
| Part B | | | |
| HDI Adduct | 90 | 90 | 90 |
| N-Butyl Acetate | 10 | 10 | 10 |
| NCO/NH Index | 1.2 | 1.2 | 1.2 |

TABLE 3-continued

Dry Time and Tack Free Time

| Composition | 1 | 2 | 3 |
|---|---|---|---|
| Tack Free time* | 9 hrs. | 4 hrs. | 3 hrs. |
| Dry to Touch time** | 17 hrs. | 10 hrs. | 10 hrs. |

Example 4. Commercial Polyaspartic Ester Blend Composition

A first component of a coating composition was prepared by combining a commercially available polyaspartic ester or blend (DESMOPHEN 1420, Bayer) with tributyl citrate at either 15% or 20% of the total weight of the component. A control composition containing no TBC was also prepared. This first component was designated "Part A." A second component, an HDI isocyanurate trimer, TOLONATE HDT (Perstorp, Toledo Ohio) was prepared and reduced to 75% non-volatile content as described in Example 1. This second component was designated "Part B." Parts A and B were then combined to a constant NCO:NH ratio of 1.05:1 to produce the coating composition. Various properties of the composition, including dry time, abrasion resistance, adhesion and chemical spot resistance were measured. Results are shown in Table 4.

TABLE 4

Cure and Physical Properties

| Composition | 1 | 2 | 3 |
|---|---|---|---|
| Part A | | | |
| Desmophen 1420 PAE | 100 | 85 | 80 |
| Tributyl Citrate | 0 | 15 | 20 |
| Part B | | | |
| HDI Adduct | 90 | 90 | 90 |
| N-Butyl Acetate | 10 | 10 | 10 |
| NCO/NH Index | 1.05 | 1.05 | 1.05 |
| Usable Pot-life mixed, minutes | 15-20' | ~10' | ~4' |
| Tack Free dry time* | 50' | 20' | 14' |
| Dry to Touch time** | 65' | 35' | 18' |

TABLE 4-continued

| Cure and Physical Properties | | | |
|---|---|---|---|
| Composition | 1 | 2 | 3 |
| Abrasion Resistance, mg loss | 66 | 96 | 61 |
| Cross Hatch Tape Adhesion (%) | 100 | | 100 |
| Skydrol Spot Resistance | No effect | | Slight Surface Softening |
| Hydraulic Fluid Resistance | No effect | | No effect |
| Motor Oil Resistance | No effect | | No effect |
| Anti-Freeze Resistance | No effect | | Slight Softening |
| Brake Fluid Resistance | Slight Surface Softening | | Severe Softening, slight Swelling |
| 20% H2SO4 Resistance | NA | | Slight Ring Effect |
| MEK double rubs | 100 | | 60 |

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims. The invention illustratively disclosed herein suitably may be practiced, in some embodiments, in the absence of any element which is not specifically disclosed herein.

What is claimed is:

1. A method to accelerate cure of a polyurea coating, comprising:
providing a first component including an isocyanate-functional component;
providing a second component including a polyaspartic ester as an isocyanate-reactive component;
providing a coreactant component comprising tri-butyl citrate, wherein the tri-butyl citrate comprises up to 20% of the isocyanate-reactive component; and
combining the isocyanate-functional component, the isocyanate-reactive component and the coreactant to produce a polyurea coating composition with accelerated cure and mixed viscosity (Gardner) of about A-1 to A-2.

2. The method of claim 1, wherein combining the isocyanate-functional component, the isocyanate-reactive component and the coreactant component comprises
combining the the coreactant component with the isocyanate-reactive component to form a mixture; and
combining the mixture with the isocyanate-functional component.

3. The method of claim 1, wherein combining the isocyanate-functional component, the isocyanate-reactive component and the the coreactant component comprises
making the isocyanate-reactive component in the presence of the;
coreactant and
combining the isocyanate-reactive component with the isocyanate-functional component.

4. The method of claim 1, wherein the isocyanate-reactive compound and the polyisocyanate are reacted together at NH:NCO ratio of 0.8:1.0 to 1.5:1.0.

5. The method of claim 1, wherein the isocyanate-reactive compound and the isocyanate-functional compound are reacted together at NH:NCO ratio of 0.8:1.0 to 1.2:1.0.

6. The method of claim 1, wherein the isocyanate-reactive compound and the isocyanate-functional compound are reacted together at NH:NCO ratio of 1.05:1.0.

7. The method of claim 1, wherein the coreactant is about 5% to up to 20% based on the total weight of the coreactant and isocyanate reactive compounds.

* * * * *